J. H. WAGENHORST.
VEHICLE WHEEL RIM.
APPLICATION FILED MAY 20, 1911.
1,201,118.
Patented Oct. 10, 1916.
2 SHEETS—SHEET 1.
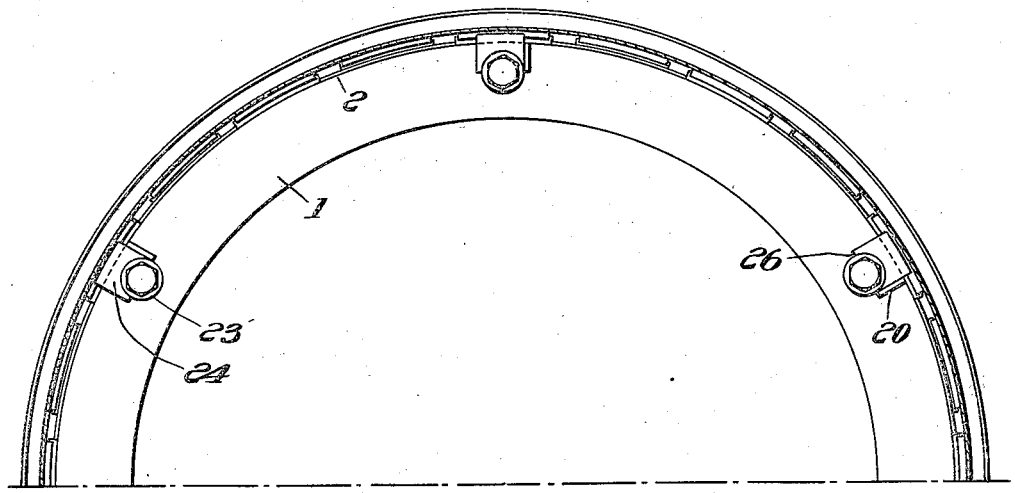
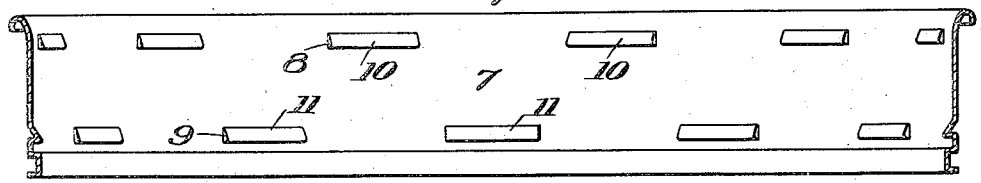
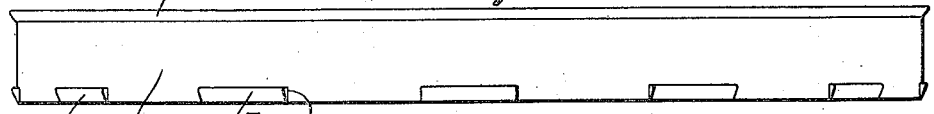
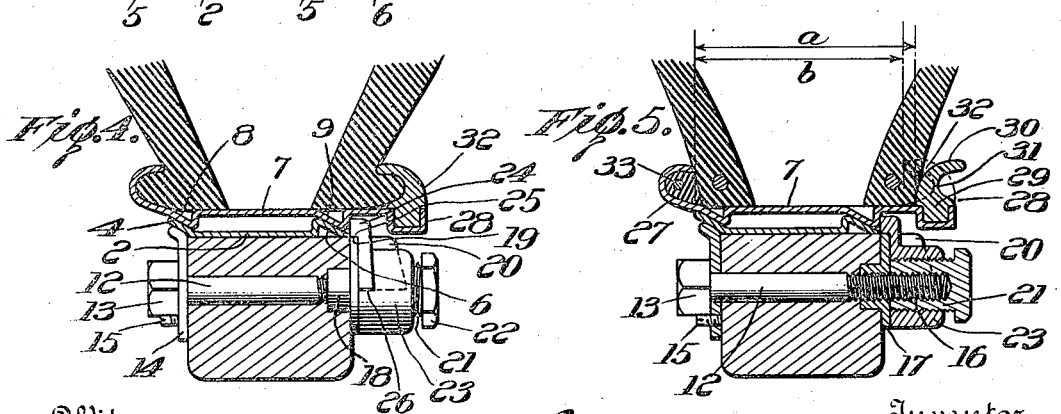
Witnesses:
Gerald E. Terwilliger
Edmund Quincy Moses
Inventor
James H. Wagenhorst
By his Attorney
Seward Davis J. H. WAGENHORST.
VEHICLE WHEEL RIM.
APPLICATION FILED MAY 20, 1911.
1,201,118.
Patented Oct. 10, 1916.
2 SHEETS—SHEET 2.
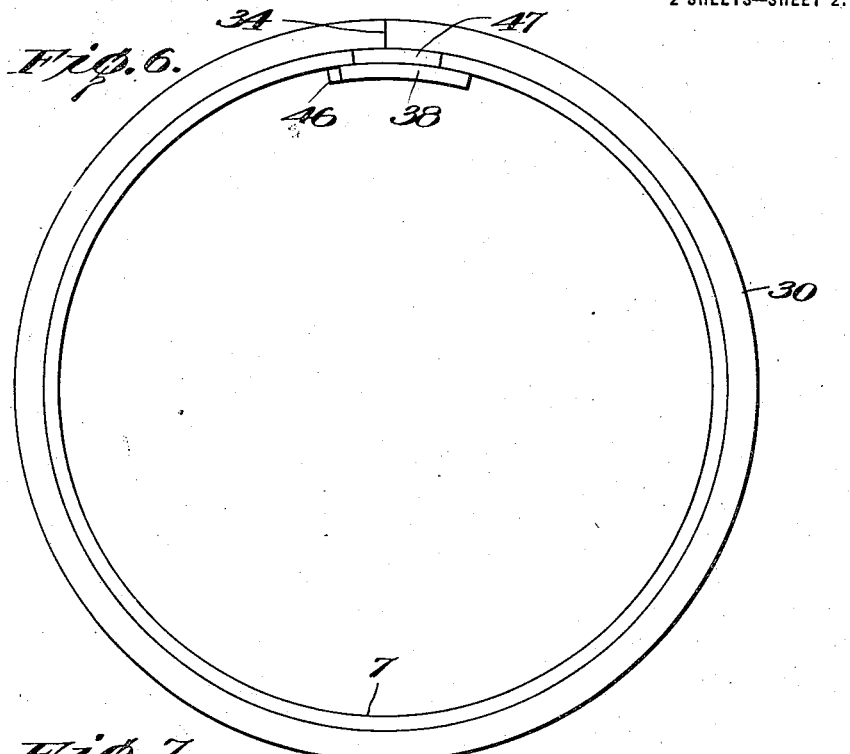
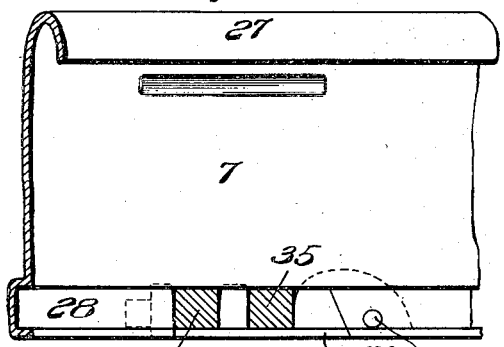
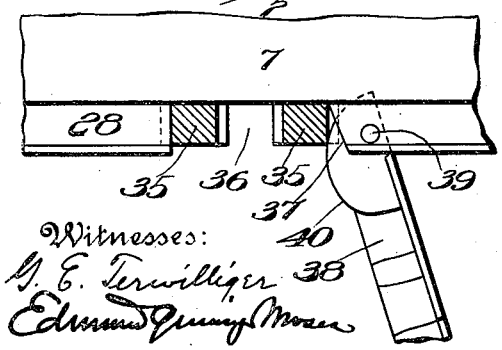
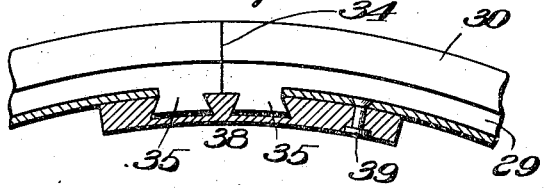
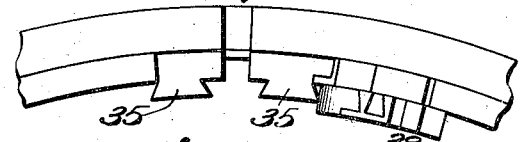
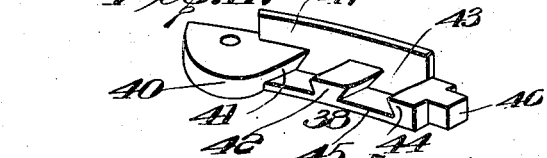
Witnesses:
G. E. Terwilliger
Edmund Quincy Moses
Inventor
James H. Wagenhorst
By his Attorney
Edward Davis

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,201,118.  Specification of Letters Patent.  Patented Oct. 10, 1916.

Application filed May 20, 1911. Serial No. 628,387.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to improvements in vehicle wheel rims of the class designed to carry a pneumatic or other resilient tire.

It comprises improvements in the tire-carrying rim by which the same is adapted to hold either clencher or straight-sided tires and an improved form of lock for securing the split detachable tire-retaining flange to the rim.

It also comprises improvements in demountable rim construction; that is, in means for detachably securing a tire-carrying rim upon a vehicle wheel.

In the accompanying drawings which form a part of this specification, Figure 1 is a side elevation of a wheel felly having mounted thereon a felly band and a tire-carrying rim, the latter being shown in section, and illustrating one embodiment of my improvements in demountable rims; Fig. 2 is a plan view of the inside of one half of the tire-carrying rim shown in Fig. 1; Fig. 3 is a plan view of the felly band shown in Fig. 1; Fig. 4 is a transverse section through the felly, felly band and tire-carrying rim, showing one of the locking devices for securing the rim upon the felly band and showing a portion of a clencher tire mounted upon the tire-carrying rim; Fig. 5 is a view similar to Fig. 4, showing the locking device in section and illustrating the manner of mounting a straight-sided tire upon the rim; Fig. 6 is a side elevation of the tire-carrying rim removed from the wheel; Fig. 7 is a plan view of a portion of the tire-carrying rim illustrating the locking means for the split removable flange in closed position, the flange being removed but the lugs thereof being shown thereon in section; Fig. 8 is a view similar to Fig. 7, showing the locking device open; Fig. 9 is a side view showing the ends of the split flange in elevation and the rim and locking device in longitudinal section; Fig. 10 is a side elevation of a portion of the rim at the locking device, the locking device being open; Fig. 11 is a perspective view of the locking device or pivoted latch removed from the rim.

In the drawings accompanying this specification I have shown but one specific embodiment of my improved vehicle wheel rim, which is to be regarded merely as illustrative of a preferred form of the invention. The invention is capable of embodiment in many other forms, and I do not wish to be limited to the exact construction illustrated and hereinafter described in detail. While the improvements in demountable rim structure and the improved form of tire-carrying rim are advantageously combined in one device, they are not necessarily so combined, and my improvements in means for mounting a rim upon a vehicle wheel may be used with tire-carrying rims of other forms than that shown, while my improved tire-carrying rim may be permanently secured to a wheel, or removably secured thereto, in any suitable manner.

Referring to the drawings in detail, the numeral 1 designates the wheel felly upon which is permanently secured by shrinking or otherwise, a felly band 2. The felly band is provided at one side with an upwardly and outwardly inclined bearing surface 3 preferably formed upon a slightly raised flange 4, while the other side of the felly band is provided with a plurality of spaced bearing surfaces 5, which may advantageously be formed by striking up portions of the felly band to form projections 6. The bearing surfaces 5 may be defined as lying in a conical surface which is substantially parallel to and of the same diameter as the essentially conical bearing surface 3. The removable tire-carrying rim is denoted by the numeral 7, and may be of any desired construction, and provided with any suitable means for retaining a pneumatic or other resilient tire. It, however, preferably embodies the improved structure shown, which will be described hereinafter. For engagement with the felly band it is provided with a plurality of spaced projections 8 and 9 having bearing surfaces 10 and 11 adapted to engage, respectively, with the bearing surfaces 3 and 5 on the felly band. These projections may be formed by striking down or depressing the metal of the rim, as shown, this method of construction being cheap and adding no weight to the rim. The surfaces 10 and 11 are preferably portions of conical surfaces parallel to the conical surfaces 3 and 5. The surfaces 11 are so spaced as to engage the spaced surfaces 5, while the surfaces 10 are staggered with relation to the surfaces 11 and 5. The projections 8 are made of such length that they will pass freely between adjacent projections 6 on the felly band so as to permit the rim to be freely placed in position or removed. The surfaces 11 are preferably formed upon spaced projections, as shown, but it will be understood that these projections may take the form of a continuous flange or ridge, if desired, without modifying the operation of the device. By forming the bearing surfaces 5 and 10 upon the interrupted projections, as described, it will be seen that the bearing surfaces at the two sides of the rim may be made of substantially the same diameter and the rim thus brought as near the felly band as possible. The waste space between the two is thus reduced to a minimum. Only sufficient clearance need be allowed between the edges of the projections and the corresponding surfaces on the felly band and rim to permit the rim to be swung obliquely from the felly, so as to permit the valve-stem to be withdrawn from its opening through the felly in a well understood manner. By bringing the tire-carrying rim close to the felly band, as is possible with this construction, the flange 4 may be made low, resulting in a saving of metal and increase in strength and rigidity. As the projections 6 stand up from the felly band, no cutting away of the felly is required in order to mount the felly band thereon, thus facilitating the attachment of the felly band and avoiding the weakening of the felly. Moreover, as the projections 6 are of equal height with the flange 4, the bearing surfaces 11 which engage therewith may be formed on the low projections 9, or on a low continuous ridge or projection, instead of on a deep inwardly projecting flange, as has been necessary in rims as heretofore constructed, in which the felly band was simply provided with a beveled edge forming a bearing surface. It is thus possible to make the projections 9 by striking up the metal of the rim, simplifying the operation of rolling the rim and effecting a substantial saving in weight.

It will be noted that the bearing surfaces of projections 6 adjoin the surface of the felly band, and, similarly, the bearing surfaces of projections 8 and 9 adjoin the surface of the rim. When the rim and felly band are in assembled position the bearing surfaces of the projections of the felly band extend from the surface of the felly band substantially to the rim surface, and, similarly, the bearing surfaces of the projections on the rim extend from the surface thereof substantially to the surface of the felly band.

For removably securing the tire-carrying rim and tire upon the felly, any suitable locking device may be used, but I prefer to employ the means shown in Figs. 1, 4 and 5, which are a modification of the locking mechanism shown and claimed broadly in my application Serial Number 589,680, filed October 29, 1910. In the modification shown herein each locking device comprises a bolt 12 passing transversely through the felly and having a head 13 by which it may be rotated, engaging a washer 14 bearing against the back of the felly. The washer may carry any suitable means for locking the bolt against accidental rotation, such as the screw 15 engaging one of the facets of the bolt-head. The bolt is provided with a screw-threaded end 16 which screws through a nut, washer or felly plate 17, securing the same permanently to the front of the felly. The felly plate 17 preferably has a sleeve portion 18 which seats in a recess in the felly and serves to give the felly plate thickness for a sufficient number of threads for a proper engagement with the bolt. The upper edge 19 of the felly plate is preferably flat, while at one side is bent out therefrom a tongue or lug 20. The threaded end of the bolt projects for some distance beyond the felly plate 17, and screwing on this projecting portion is an externally threaded sleeve 21 having a head 22 formed for engagement by a wrench or other means for rotating the same. The external thread on this sleeve is preferably of opposite pitch from the thread on the projecting end of the bolt. Screwing on this sleeve is a keeper 23 having at one side thereof a projection or eccentric portion 24, which, when the keeper is moved to operative position, engages a portion of the tire-carrying rim. With the form of rim shown the keeper engages the outer substantially vertical face of one of the projections 9. When the keeper is rotated through a half revolution this eccentric portion will be moved out of the path of the projection 9 so as to permit the removal of the rim. With the keeper in normal locked position, as shown in Fig. 4, such rotation thereof is prevented by the engagement of the shoulder 25 of the eccentric portion 24 with the flat upper surface 19 of the felly plate. To move the keeper to inoperative position, it is simply necessary to rotate the sleeve 21 in a direction to cause it to unscrew from the bolt 12, which rotation will also cause the keeper to screw along the sleeve 21 toward the head thereof. The keeper will thus be drawn away from the felly until the shoulder 25 is clear of the felly plate, when the continued rotation of the sleeve 21 will carry the keeper around with it. The keeper will be stopped, however, when it has made approximately a half revolution by the engagement of a shoulder 26 formed at one side thereof with the under-side of the lug 20, and the engagement of this lug with the side of the keeper will serve to hold it in its inverted position. When each of the locking devices has been operated in this manner the rim may be removed and a similar rim carrying a fresh tire substituted for it. The keepers may then be returned to operative position by simply rotating the sleeves 21 in the opposite direction, which will carry the keepers back to the position shown in the drawings, where they will be stopped by their engagement with the lugs 20, as shown in Fig. 1. The continued rotation of the sleeves 21 will cause the keepers to move toward the felly, the projecting portions thereof engaging with the projections 9 and forcing the tire-carrying rim into wedging engagement with the felly band. In this process the shoulders on the keepers 25 will move over the felly plates 18 and be locked against rotation. The parts are preferably so designed that the inner ends of the sleeves 21 will screw against the felly plates at the same time that the tire-carrying rim has been properly forced upon the felly band, thus permitting these sleeves to act as jam or lock nuts. Such action of the sleeves also limits the amount of movement of the different keepers and thus insures the symmetrical positioning of the rim upon the felly.

The improvements thus far described are applicable to tire-carrying rims of almost any construction. I prefer, however, to use them in connection with an improved form of tire-carrying rim, which I will now describe.

The rim 7 is provided at one side with tire-retaining means of ordinary constrution, such as an endless, removable and reversible flange, or with an integral flange or clench 27, as shown. At the other side the rim is provided with a channel 28, in which fits the base 29 of a transversely split clench ring or flange 30. The flange ring 30 has formed in one side thereof a groove 31 adapted to receive the bead of a clencher tire, while its other side is formed as shown at 32, in proper form to retain a straight-sided tire. When the rim is to carry a straight-sided tire, the clench 27 is filled with a filler ring 33 in the manner described in a patent to Hopkinson, Number 893,075, dated July 14, 1908, and the ring 30 is placed in its channel in the position shown in Fig. 5. As the width of rim required to receive a straight-sided tire of standard proportions, represented in Fig. 5 by the dimension $a$, is greater than the width between the edges of the clenches of a rim adapted to receive a standard clencher tire, represented by the dimension $b$, I so proportion the dimensions of the flange 30 as to give this greater width when the flange is reversed. This I accomplish by offsetting the base 29 of the ring with relation to the groove 31 therein, as shown in the drawings, so that when the ring is changed from the clencher position shown in Fig. 4 and in dotted lines in Fig. 5 to the reverse position, in which it is adapted to retain a straight-sided tire, shown in full lines in Fig. 5, the increased width may be obtained.

For securing the split clench ring in its channel 28, I have devised an improved locking device, which is illustrated in Figs. 6 to 11, inclusive of the drawings. This locking device comprises an improved form of latch pivoted to a portion of the rim and adapted to engage and draw together lugs formed upon the ends of the split flange. The flange 30, which is transversely split at 34, has secured to or formed upon the under-side of each end thereof an under-cut or dovetail shaped lug 35, these lugs passing through a slot 36 in the bottom of the channel 28. This slot is preferably open at the side, as shown, although this is not necessary, and may have an inclined end 37, if desired, to guide one of the lugs 35 into position. The split flange may readily be sprung into the channel 28, where, however, it will fit loosely, its ends usually remaining separated, as shown in Fig. 10. The lugs 35 will then occupy substantially the positions indicated in Fig. 8. My improved form of pivoted latch is designed first to draw the lugs together into the position shown in Fig. 7, which will cause the ends of the flange to abut, as indicated in Figs. 6 and 9, and then to lock the ends of the rim in that position. This latch I designate by the numeral 38 and it is pivoted to the bottom of the channel 28 by a pivot pin 39. It is provided with an eccentric portion or cam 40 which engages with one of the lugs 35 when the latch is open, as shown in Fig. 8, the closing of the latch causing the cam to move the lug 35 circumferentially of the rim into the position shown in Fig. 7. For securing the lugs in position when the latch is closed, the surface of the cam 40 is under-cut, as indicated at 41, so that this portion of the cam surface will overhang one side of one of the lugs 35, the other side of that lug being engaged by one side of a tooth 42 projecting from the back 43 of the latch. The other side of the tooth 42 engages the second lug 35, which is also engaged by the under-cut outer wall 44 of the latch. The cam portion 40, tooth 42, and outer wall 44 of the latch are connected by the back 43 of the latter, and also by the web or bottom 45 which effectually prevents the spreading of these parts when the latch is forced into engagement with the lugs, or, under the influence of centrifugal force, tending to separate the ends of the ring 30. The outer end of the latch may have formed upon it a projection 46 adapted to be engaged by a wrench, which may be used in opening or closing the latch. The wall 43 of the latch may also have an upwardly projecting portion 47 adapted to fill out the cut-away portion of the outer flange of the channel 28 of the rim. The entire latch is preferably of integral construction.

By the use of the improved latch above described, it will be seen that a rim is produced in which the split tire-retaining flange is very firmly and solidly locked to the rim. Any tensional strain upon the flange is taken up by the latch 38, which may be made of very solid and substantial construction, and does not come upon the pivot 39. The latch not only holds the ends of the flange in abutment, but, owing to the dovetail shape of the lugs 35, also draws the ends of the flange firmly down into the channel 28. Owing to the formation of the latch with the cam portion 40, the flange may be locked in position without the use of any special tool for drawing its ends together. In many forms of rims as heretofore constructed, the use of such a tool has been necessary, as the flange when sprung into its channel, would not fit closely therein, and its ends would remain separated, as indicated in Fig. 10. With these rims, before the locking device could be applied, it was necessary to draw the ends of the rim together by means of a tool.

Having thus described my invention, I claim:

1. In a vehicle wheel, in combination, a fixed rim having laterally separated bearings of like inclination, one of said bearings being composed of a series of spaced projections; a tire-carrying rim having laterally separated bearings of like inclination, both said bearings being composed of a series of spaced projections, the projections of one series being alternately disposed relatively to those of the other series, the bearings of the tire-carrying rim being adapted to seat upon the bearings of the fixed rim, and means for promoting a wedging engagement therebetween.

2. In a vehicle wheel, in combination, a fixed rim of uniform thickness having laterally separated inclined bearing surfaces of like inclination integral therewith, one of said bearing surfaces being composed of a plurality of projections; a tire-carrying rim of uniform thickness having laterally separated inclined bearing surfaces of like inclination integral therewith, one of said bearing surfaces being composed of a plurality of projections, the bearing surfaces upon the tire-carrying rim being adapted to engage the bearing surfaces upon the fixed rim in wedging relation, and means for promoting the wedging engagement therebetween.

3. In a vehicle wheel, in combination, a fixed rim having a flange at one edge thereof provided with a beveled bearing surface, and having at the other edge thereof a plurality of spaced projections, each provided with a beveled bearing surface substantially parallel to the beveled surface of said flange, and a removable tire-carrying rim mounted on said fixed rim and provided with means adapted to engage the bearing surfaces on said spaced projections, and with spaced projections having bearing surfaces adapted to engage the bearing surface on the flange on the fixed rim, the projections on said tire-carrying rim being so proportioned and spaced as to pass between the projections on the fixed rim to permit the removal of the tire-carrying rim.

4. In a vehicle wheel, in combination, a felly having a felly band thereon, said felly band provided at one edge with an upwardly and outwardly inclined flange, and having the metal at the other edge thereof pressed up at intervals to form projections having beveled bearing surfaces, a removable tire-carrying rim carrying means to engage the bearing surfaces on said projections, and provided with integral projections having bearing surfaces engaging the bearing surface of the flange on the felly band, the projections on the rim being shorter than the spaces between adjacent projections on the felly band and being located opposite said spaces, and means for securing said rim upon said felly band.

5. In a vehicle wheel, in combination, a felly, a felly band secured thereto and having at one edge thereof an upwardly and outwardly inclined flange, the metal of the other edge of said felly band being pressed up at intervals to form spaced projections having beveled bearing surfaces substantially parallel with the beveled outer surface of said flange, a removable tire-carrying rim mounted on said felly-band having a series of depressed projections near one side thereof engaging the spaced projections on the felly band, and having near the other side thereof a second series of spaced projections engaging the bearing surface on the flange on the felly band, the second series of projections on the rim being shorter than the spaces between adjacent projections on the felly band and being located opposite said spaces, and means for securing said rim upon said felly band.

6. In a vehicle wheel, in combination, a fixed rim provided adjacent one edge with a series of struck-up projections, said projections having conical bearing surfaces adjoining the surface of said rim, a removable tire-carrying rim provided adjacent one edge with a series of struck-up projections having beveled bearing surfaces adjoining the surface thereof, the surfaces of the projections upon the tire-carrying rim corresponding to the surfaces of the projections upon the fixed rim, and means for securing said tire-carrying rim upon said fixed rim in wedging engagement therewith.

JAMES H. WAGENHORST.

Witnesses:
    SEWARD DAVIS,
    EDMUND QUINCY MOSES.